United States Patent
Kwak et al.

(10) Patent No.: US 8,705,457 B2
(45) Date of Patent: Apr. 22, 2014

(54) APPARATUS AND METHOD FOR TRANSMITTING CONTROL CHANNEL FOR FREQUENCY RESOURCE ALLOCATION IN A WIRELESS COMMUNICATION SYSTEM

(75) Inventors: Yong-Jun Kwak, Yongin-si (KR); Hwan-Joon Kwon, Suwon-si (KR); Ju-Ho Lee, Suwon-si (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 1208 days.

(21) Appl. No.: 12/147,151

(22) Filed: Jun. 26, 2008

(65) Prior Publication Data
US 2009/0003274 A1  Jan. 1, 2009

(30) Foreign Application Priority Data
Jun. 26, 2007 (KR) .................. 10-2007-0063346

(51) Int. Cl.
*H04Q 7/00* (2006.01)
*H04W 4/00* (2009.01)

(52) U.S. Cl.
USPC .......................................................... 370/329

(58) Field of Classification Search
USPC ........................... 370/329, 335, 343; 455/442
See application file for complete search history.

(56) References Cited

U.S. PATENT DOCUMENTS

| | | | | |
|---|---|---|---|---|
| 6,490,260 B1* | 12/2002 | Hwang | .......................... | 370/335 |
| 7,782,896 B2* | 8/2010 | Kuri et al. | ...................... | 370/465 |
| 7,912,092 B2* | 3/2011 | Kowalski | ....................... | 370/491 |
| 7,916,623 B2* | 3/2011 | Kim et al. | ...................... | 370/208 |
| 8,102,802 B2* | 1/2012 | Ratasuk et al. | ............... | 370/329 |
| 2003/0137965 A1* | 7/2003 | Tarvainen | ...................... | 370/347 |
| 2007/0053320 A1* | 3/2007 | Rinne et al. | ................... | 370/329 |
| 2007/0076713 A1* | 4/2007 | Odenwalder et al. | ......... | 370/389 |
| 2007/0230406 A1* | 10/2007 | Kim et al. | ...................... | 370/335 |
| 2007/0258373 A1* | 11/2007 | Frederiksen et al. | ......... | 370/235 |
| 2008/0085718 A1* | 4/2008 | Kuchibhotla et al. | ....... | 455/452.1 |
| 2008/0232240 A1* | 9/2008 | Baum et al. | ................... | 370/210 |
| 2008/0267057 A1* | 10/2008 | Kotecha | ........................ | 370/203 |
| 2008/0318579 A1* | 12/2008 | McCoy et al. | ................ | 455/442 |
| 2009/0262699 A1* | 10/2009 | Wengerter et al. | ............ | 370/330 |
| 2009/0303950 A1* | 12/2009 | Ofuji et al. | .................... | 370/329 |
| 2010/0067479 A1* | 3/2010 | Choi et al. | ..................... | 370/330 |
| 2010/0069081 A1* | 3/2010 | Mitra et al. | ................. | 455/452.2 |

(Continued)

OTHER PUBLICATIONS

Ericsson, NTT DoCoMo, E-UTRA Downlink Control Signaling—Overhead Assessment, Feb. 13-17, 2006, 3GPP TSG-RAN WG1 #44 R1-060573, pp. 1-7.*

Ericsson, Signaling of E-UTRA Scheduling Information, Jan. 23-25, 2006, 3GPP TSG-RAN WG1 LTE Ad Hoc Meeting R1-060094, pp. 1-2.*

(Continued)

*Primary Examiner* — Brandon Renner
*Assistant Examiner* — Faisal Choudhury
(74) *Attorney, Agent, or Firm* — The Farrell Law Firm, P.C.

(57) ABSTRACT

A method is provided for transmitting a control channel for resource allocation to a terminal by a base station in an Orthogonal Frequency Division Multiple Access (OFDMA) wireless communication system. An additional resource allocation indicator is set indicating whether the number of consecutive resource block sets allocated to a terminal is greater than one. A reference control channel is generated including reference resource allocation information for a first consecutive resource block set and the set additional resource allocation indicator. An additional control channel using additional resource allocation information is generated, when there are one or more additional consecutive resource block sets. At least one of the generated reference control channel and the generated additional control channels is encoded before transmission.

16 Claims, 11 Drawing Sheets

(56) References Cited

U.S. PATENT DOCUMENTS

| | | | |
|---|---|---|---|
| 2010/0246498 A1* | 9/2010 | Lim et al. | 370/329 |
| 2010/0290406 A1* | 11/2010 | Miki et al. | 370/329 |
| 2011/0051672 A1* | 3/2011 | Lee et al. | 370/329 |

OTHER PUBLICATIONS

Ericsson, Signaling of E-UTRA Scheduling Information, Jan. 23-25, 2006, TSG-RAN WG1 LTE Ad Hoc Meeting R1-060094.*

* cited by examiner

APPARATUS AND METHOD FOR TRANSMITTING CONTROL CHANNEL FOR FREQUENCY RESOURCE ALLOCATION IN A WIRELESS COMMUNICATION SYSTEM

PRIORITY

This application claims priority under 35 U.S.C. §119(a) to a Korean Patent Application filed in the Korean Intellectual Property Office on Jun. 26, 2007 and assigned Serial No. 2007-63346, the disclosure of which is incorporated herein by reference.

BACKGROUND OF THE INVENTION

1. Field of the Invention

The present invention relates generally to an apparatus and method for allocating resources in a wireless communication system, and more particularly, to an apparatus and method for allocating frequency resources in an Orthogonal Frequency Division Multiple Access (OFDMA) wireless communication system.

2. Description of the Related Art

Recently, in wireless communication systems, intensive research has been conducted on Orthogonal Frequency Division Multiplexing (OFDM) and/or OFDMA as a scheme suitable for high-speed data transmission in wireless channels. OFDM, a scheme for transmitting data using multiple carriers, is a kind of Multi-Carrier Modulation (MCM) that converts a serial input symbol stream into parallel symbol streams, and modulates each of them with multiple orthogonal subcarriers, i.e., multiple orthogonal subcarrier channels before transmission.

FIG. 1 is a diagram illustrating a transmitter structure of a general OFDM system.

An OFDM transmitter includes a channel encoder 101, a modulator 102, a Serial-to-Parallel (S/P) converter 103, an Inverse Fast Fourier Transform (IFFT) unit 104, a Parallel-to-Serial (P/S) converter 105 and a Cyclic Prefix (CP) inserter 106. The channel encoder 101, also known as a channel-encoding block, performs channel coding on an input information bit stream. Generally, a convolutional encoder, turbo encoder, a Low Density Parity Check (LDPC) encoder, etc. are used as the channel encoder 101. The modulator 102 generates modulation symbols by performing modulation, such as Quadrature Phase Shift Keying (QPSK), 8-ary Phase Shift Keying (8PSK), 16-ary Quadrature Amplitude Modulation (16-QAM), 64-QAM, 256-QAM, etc., on the output of the channel encoder 101. Although not illustrated in FIG. 1, a rate-matching block for performing repetition and puncturing can be further interposed between the channel encoder 101 and the modulator 102. The S/P converter 103 serves to convert the output of the modulator 102 into parallel data.

The IFFT unit 104 performs IFFT calculation on the output of the S/P converter 103. The output of the IFFT unit 104 is converted into serial data by the P/S converter 105. A CP inserter 106 inserts a CP code into the output of the P/S converter 105. The Long Term Evolution (LTE) system now under discussion as the next generation wireless communication system of the Universal Mobile Telecommunication Service (UMTS) system in the $3^{rd}$ Generation Partnership Project (3GPP) standard group for asynchronous communication, uses Single Carrier Frequency Division Multiple Access (SC-FDMA) for the uplink to solve the increase in Peak-to-Average Power Ratio (PAPR), which is a defect of the OFDMA scheme. SC-FDMA, a kind of the OFDM scheme, can be realized by adding a Fast Fourier Transform (FFT) unit in front of the IFFT unit 104, and precoding the data before it undergoes IFFT calculation in the IFFT unit 104.

FIG. 2 schematically illustrates resources of a general OFDM system.

As shown in FIG. 2, in OFDM or SC-FDMA, wireless resources are expressed in a two-dimensional arrangement in time and frequency domains. In FIG. 2, the horizontal axis represents a time domain 201, and the vertical axis represents a frequency domain 202. In the time domain 201, 7 OFDM symbols constitute one 204, and two slots constitute one subframe 205. Generally, one subframe 205 has the same length as a Transmission Time Interval (TTI), which is a basic transmission unit.

FIG. 3 is a diagram illustrating a data transmission/reception procedure between a base station and a terminal in a general OFDM system.

In step 303, a terminal (or User Equipment (UE)) 320 generates a Channel Quality Indicator (CQI) indicating the downlink channel condition by measuring a Reference Signal (RS) such as a pilot, transmitted by a base station (or Node B) 310. In step 304, the terminal 320 transmits the CQI to the base station 310. In this case, the terminal 320 can transmit a Channel Sounding Reference Signal (CS/RS) along with the CQI so that the base station 310 can detect the uplink channel condition. Upon receipt of the CQI and/or CS/RS, the base station 310 performs scheduling in step 305, to determine downlink or uplink resources it will allocate to the terminal 320. In step 306, the base station 310 transmits a scheduling grant indicating the determined downlink/uplink resources to the terminal 320. Then the terminal 320 checks in step 307 whether the scheduling grant is delivered to the terminal 320 itself. If it is checked in step 307 that the scheduling grant is transmitted to the terminal 320 itself, the terminal 320 detects, in step 308, downlink/uplink resources indicated by the scheduling grant and performs data exchange with the base station 310 using the allocated downlink/uplink resources.

In the scheduling process, the base station 310 delivers the information necessary for data transmission/reception to the terminal 320 using a scheduling grant, and the scheduling grant is transmitted to the terminal 320 over a forward Physical Downlink Control Channel (PDCCH). The PDCCH uses some of the resources shown in FIG. 2. The base station 310 selects one or multiple PDCCHs from among available PDCCHs, and transmits the scheduling grant to the terminal 320 through the selected PDCCH(s).

The scheduling grant includes therein several types of information, and its typical information can include the amount of packet information, a modulation method, allocated resources, and Hybrid Automatic Repeat reQuest (HARQ) information. Of the above-stated information, the information on the allocated resources can have an important meaning in the OFDMA communication system. In the OFDMA communication system, a frequency band can be divided into a part having a good channel response and a part having a bad channel response at an arbitrary time. Allocating resources in the good channel response frequency band to the terminal is required to increase the performance of frequency-selective scheduling. Therefore, there is a need for a resource allocation method capable of maximally increasing the performance of the frequency-selective scheduling.

FIG. 4 is a diagram illustrating a frequency resource allocation method in a general OFDM system.

The frequency resource allocation method of FIG. 4 illustrates a start point of a resource block set and the number of resource blocks. In FIG. 4, an entire frequency bandwidth 401 is composed of N Resource Blocks (RBs), and when there is a wish to allocate a resource block #6 402 through a resource block #9 403 to an arbitrary terminal, the resource allocation information included in a scheduling grant includes a start point 404 (i.e., resource block #6 402) of the allocated resources and a number of the allocated resource blocks 405.

FIG. 5 is a diagram illustrating frequency resources allocated in a general OFDM system.

FIG. 5 shows several cases for a set of frequency resource blocks allocated to an arbitrary terminal. Reference numeral 501 represents a case where one consecutive resource block set is allocated to one terminal. Reference numeral 502 represents a case where multiple consecutive resource block sets are allocated to one terminal. Reference numeral 503 represents a case where the entire resource block is allocated to one terminal. In the cases 501 and 503, the resource allocation method of FIG. 4 can perform resource allocation with one start point and the number of resource blocks. However, in the case 502 where there is an intention to allocate resource block sets 511, 512 and 513 to one terminal, since multiple consecutive resource block sets are available for resource allocation, it is necessary to indicate the start point and the number of resource blocks separately for each of the consecutive resource block sets.

In order to increase frequency-selective scheduling performance of the OFDMA communication system, consideration should be given to the case 502 where multiple consecutive resource block sets are available. However, in providing information on the start point of the resource block sets and the number of resource blocks for resource allocation, as the amount of information that should be signaled varies according to the number of consecutive resource block sets, there are several formats for scheduling grant channels transmitted to the terminal. When there are several formats for scheduling grant channels, since the terminal cannot judge whether a corresponding scheduling grant channel is a channel transmitted to the terminal itself unless it decodes all the channels in the several formats, its reception complexity increases with the number of formats of the scheduling grant channels. In addition, the base station should transmit many scheduling grant channels, causing a reduction in efficient utilization of resources.

SUMMARY OF THE INVENTION

The present invention has been made to address at least the above problems and/or disadvantages and to provide at least the advantages described below. Accordingly, an aspect of the present invention provides a resource allocation apparatus and method capable of increasing resource efficiency in an OFDM and/or OFDMA-based wireless communication system.

Another aspect of the present invention provides a resource allocation apparatus and method capable of reducing complexity of a terminal in an OFDM and/or OFDMA-based wireless communication system.

A further aspect of the present invention provides a resource allocation apparatus and method capable of increasing transmission efficiency in an OFDM and/or OFDMA-based wireless communication system.

According to one aspect of the present invention, a method is provided for transmitting a control channel for resource allocation to a terminal by a base station in an OFDMA wireless communication system. An additional resource allocation indicator is set indicating whether the number of consecutive resource block sets allocated to a terminal is greater than one. A reference control channel is generated including reference resource allocation information for a first consecutive resource block set and the set additional resource allocation indicator. An additional control channel using additional resource allocation information is generated, when there are one or more additional consecutive resource block sets. At least one of the generated reference control channel and the generated additional control channel is encoded before transmission.

According to another aspect of the present invention, a method is provided for receiving a control channel for resource allocation transmitted from a base station by a terminal in an OFDMA wireless communication system. A first consecutive resource block set is checked using reference resource allocation information included in a reference control channel received from a base station. It is determined whether a value of the additional resource allocation indicator indicates that the number of consecutive resource block sets is greater than one. An additional control channel is received and an additional resource block depending thereon is checked, when the number of consecutive resource block sets is greater than one.

According to a further aspect of the present invention, a base station apparatus is provided for transmitting a control channel for resource allocation to a terminal in an OFDMA wireless communication system. The transmission apparatus includes a scheduler for allocating resources for at least one terminal, dividing the resources into reference allocation resources corresponding to a first consecutive resource set and additional allocation resources, and outputting the scheduling result and other control information together with the resource allocation information. The transmission apparatus also includes a resource allocation controller for determining whether the number of consecutive resource block sets is greater than one based on the received scheduling result, and generating an additional resource allocation indicator corresponding to the determination result. Additionally, the transmission apparatus includes a multiplexer for multiplexing the input reference allocation resources, other control information, and additional resource allocation indicator. Further, the transmission apparatus includes a first encoder for encoding information output from the multiplexer to generate a reference control channel, and a second encoder for encoding input additional allocation resources according to the determination result output from the resource allocation controller, to generate an additional control channel.

According to yet another aspect of the present invention, a reception apparatus is provided for receiving a control channel for resource allocation transmitted from a base station in an OFDMA wireless communication system. The reception apparatus includes a reference control channel checker for receiving a reference control channel, and outputting check information of an allocated reference resource block together with an additional resource allocation indicator. The reception apparatus also includes an additional control channel checker for receiving an additional control channel, and outputting check information of an allocated additional resource block. The reception apparatus further includes an additional resource controller for determining whether the number of consecutive resource block sets is greater than one based on the additional resource allocation indicator, and outputting a control signal to the demultiplexer according to the determination result. Additionally, the reception apparatus includes a demultiplexer for inputting a signal received from the base station to the reference control channel checker, separating an additional control channel according to the control signal from the additional resource controller, and outputting the separated additional control channel to the additional resource controller. The reception apparatus also includes a controller for controlling reception of a physical channel according to the received reference resource block check information and additional resource block check information.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
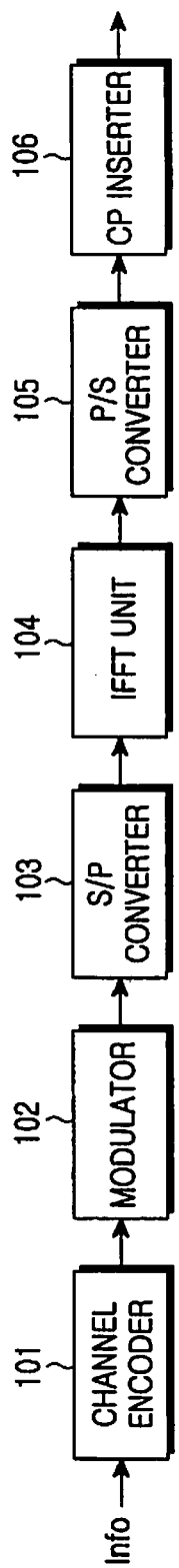
FIG. 1 is a diagram illustrating a transmitter structure of a general OFDM system.
Figure 2:
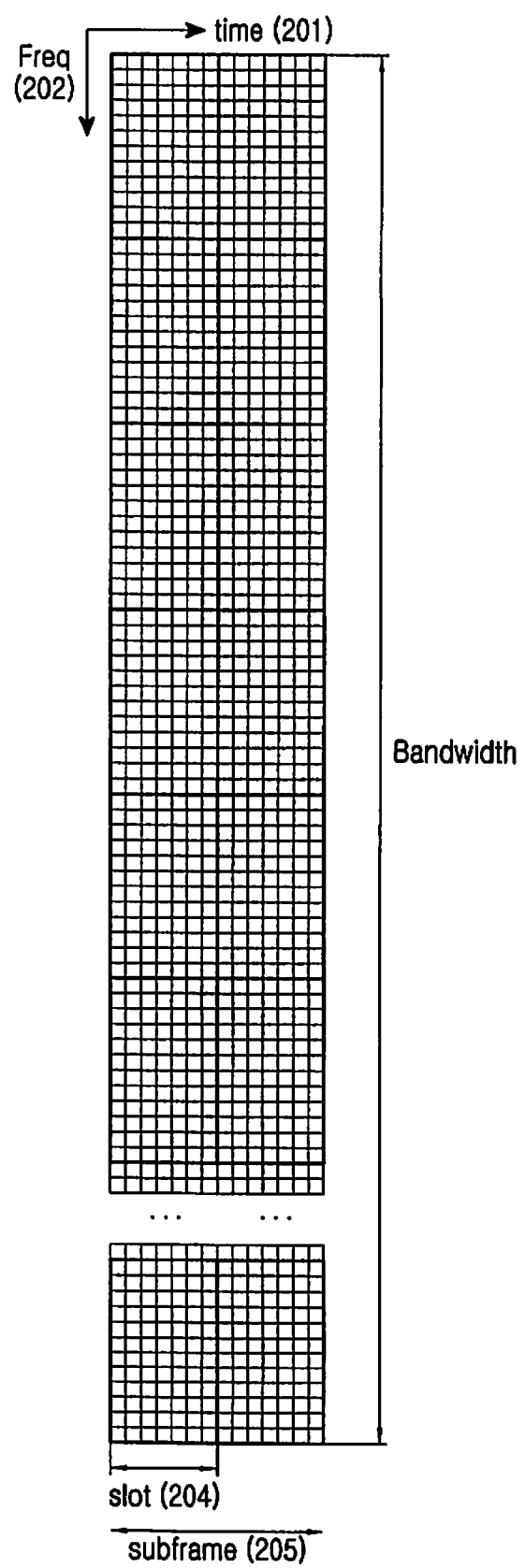
FIG. 2 is a diagram schematically illustrating resources of a general OFDM system.
Figure 3:
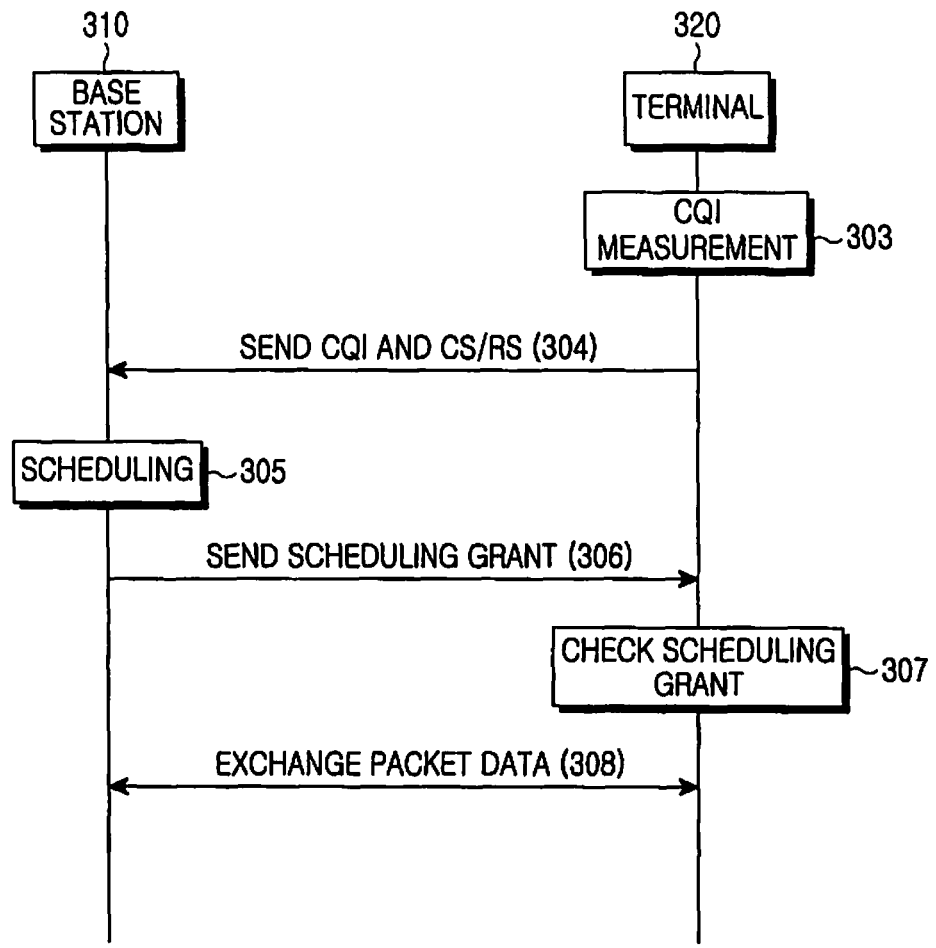
FIG. 3 is a diagram illustrating a data transmission/reception procedure between a base station and a terminal in a general OFDM system.
Figure 4:
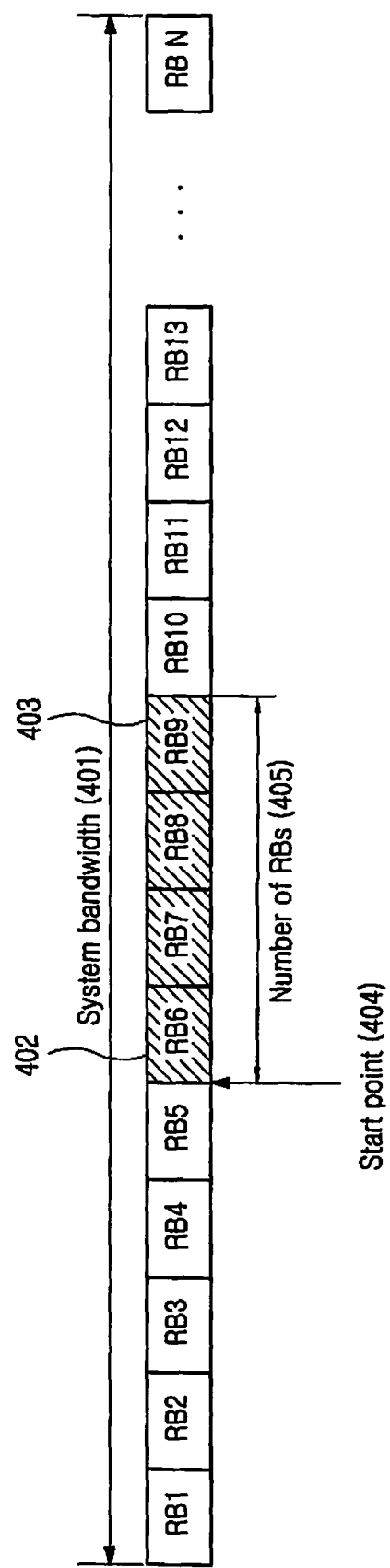
FIG. 4 is a diagram illustrating a frequency resource allocation method in a general OFDM system.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention.

Although a description of the present invention will be given herein with reference to the LTE system, by way of example, the present invention can be applied to other wireless communication systems to which base station scheduling is applied, without separate modification.

The present invention provides a method in which a base station efficiently delivers resource allocation information in delivering control information for data transmission/reception to a terminal in a wireless communication system. The method provided herein includes a method for generating control channels including indication information for the resources that the terminal should transmit/receive.

Figure 6:
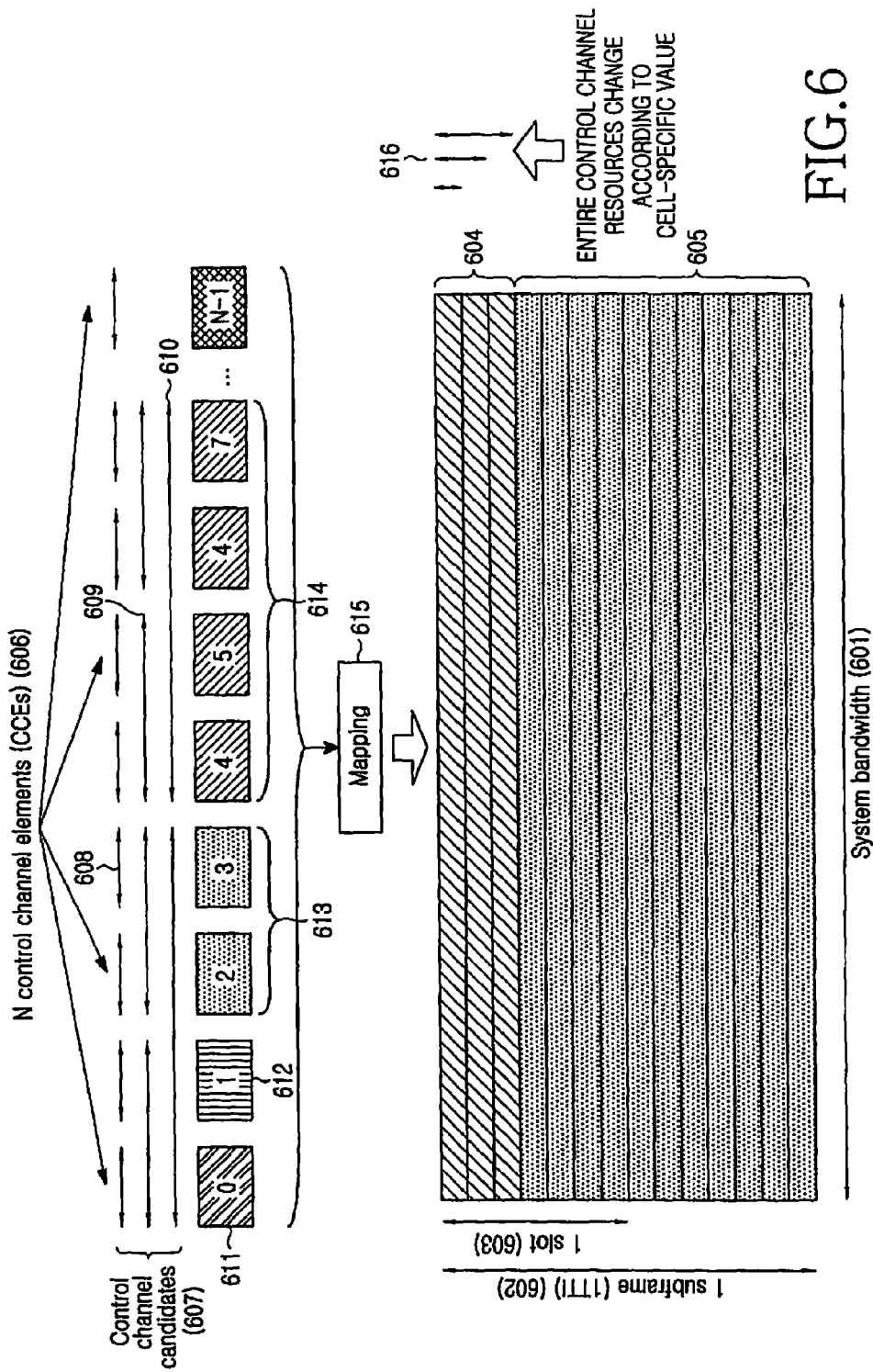
FIG. 6 is a diagram illustrating a structure of control channels used in an LTE system.

FIG. 6 is a diagram illustrating a structure of control channels used in an LTE system.

In an entire frequency bandwidth 601, the minimum time unit of resources is one slot 603 that includes 7 (or multiple) OFDM symbols, and two slots constitute one subframe 602. The subframe 602 is the minimum resource allocation unit, and its length is generally equal to a Transmission Time Interval (TTI), which is a data transmission unit. PDCCHs are mapped to several OFDM symbols 604 (hereinafter referred to as a 'control channel resource region') situated in the foremost part among the multiple OFDM symbols included in one subframe 602, Physical Downlink Shared Channels (PDSCHs), on which packet data is carried, are mapped to the remaining OFDM symbols 605.

PDCCHs for downlink/uplink transmission for multiple terminals exist in the control channel resource region 604, and generation of each PDCCH will be described below. Control Channel Elements (CCEs) in a specific size are used to generate PDCCHs, and one PDCCH is composed of one or multiple CCEs. A base station transmits control information to a terminal having a good channel state using PDCCH composed of one CCE at a high coding rate. A base station transmits the same-sized control information to a terminal having a bad channel state using PDCCH composed of multiple CCEs, so that even the terminal in the bad channel condition can stably receive the control information over PDCCH.

For example, PDCCH candidates 607 are generated using CCE sets, each of which is composed of one CCE 608, two CCEs 609, four CCEs 610, or eight CCEs among the multiple CCEs 606 existing in the entire control channel resource region 604. In the case where the total number of CCEs is N, N PDCCH candidates are generated when 1 CCE is used for each PDCCH; [N/2] PDCCH candidates are generated when 2 CCEs are used for each PDCCH; [N/4] PDCCH candidates are generated when 4 CCEs are used for each PDCCH; and [N/8] PDCCH candidates are generated when 8 CCEs are used for each PDCCH. Here, the expression '[A]' indicates the maximum integer not exceeding 'A'.

In FIG. 6, PDCCHs 611 and 612 each are allocated to their associated terminals using one CCE. PDCCH 613 is composed of two CCEs, and PDCCH 614 is generated using four CCEs. The PDCCHs 611, 612, 613 and 614 are mapped together to the control channel resource region 604 as shown in step 615.

The control channel resource region 604, to which multiple PDCCHs are mapped, uses first several OFDM symbols in one subframe. In this case, the number of simultaneously used PDCCHs, or the number of necessary CCEs, can vary every time the number of the currently available terminals and the channel states of the terminals are taken into account. A size of the control channel resource region 604 for PDCCHs varies as shown by reference numeral 616. The LTE system can change the size 616 of the control channel resource region 604 where PDCCHs are included, using a Control Channel Format Indicator (CCFI), which is periodic information.

The PDCCHs include therein a size of transmission packet data, antenna information, a modulation method, HARQ information, resource allocation information, etc. Information excluding the resource allocation information, i.e., the data size, the antenna information, the modulation method and the HARQ information, will be referred to herein as 'other control information'. The other control information is always maintained in its size. However, the resource allocation information, as described above, varies in its required size according to the number of consecutive resource block sets.

Figure 7A:
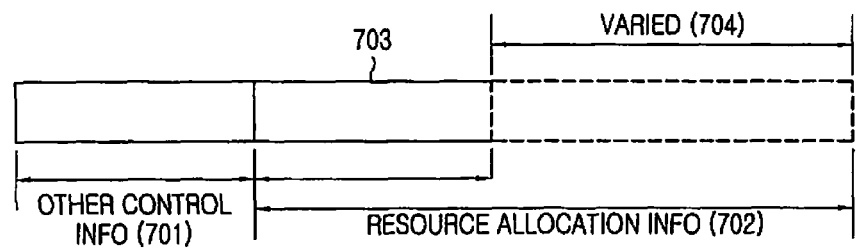
FIG. 7A is a diagram illustrating a structure of a control channel used for resource allocation in an LTE system.

FIG. 7A is a diagram illustrating a structure of a control channel used for resource allocation in an LTE system.

While the other control information indicated by reference numeral 701 is equal in size, the resource allocation information indicated by reference numeral 702 varies from a smallest size 703 to a size including variable information 704 according to the number of consecutive resource block sets. That is, information can be additionally included according to the number of consecutive resource block sets. Therefore, the change in the size due to the variable information 704 changes the PDCCH format, increasing the load that the terminal should perform decoding on all possible combinations of the received control channel formats.

The present invention provides a channel structure that fixes, to one, the number of PDCCH formats the terminal should preferentially receive, so that it can satisfy even the case where the number of consecutive resource block sets is greater than one (indicating the multiple number of consecutive resource block sets), while reducing the decoding load of the terminal.

Figure 7B:
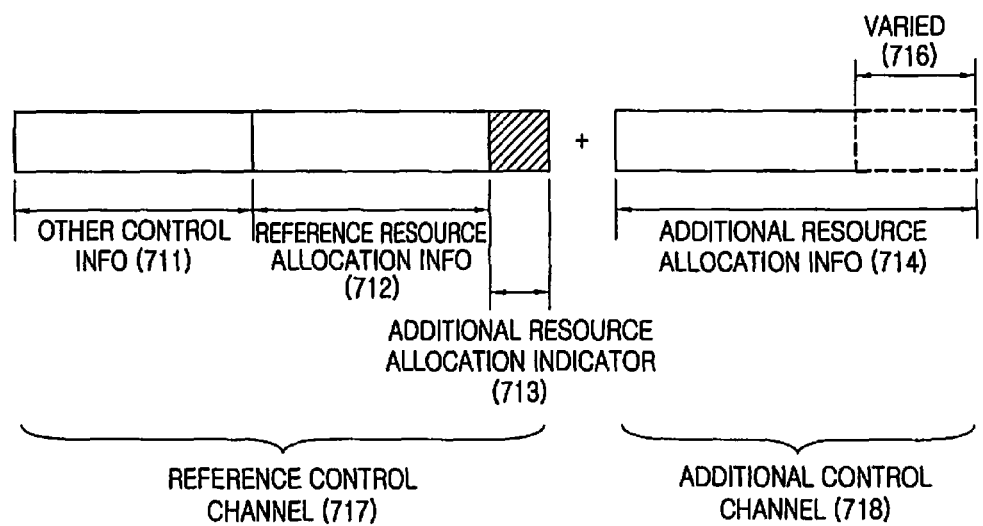
FIG. 7B is a diagram illustrating a control channel structure for transmitting resource allocation information according to an embodiment of the present invention.

FIG. 7B is a diagram of a control channel structure for transmitting resource allocation information according to an embodiment of the present invention.

In FIG. 7B, PDCCH transmitted to each terminal is divided into a reference control channel 717 and an additional control channel 718. The reference control channel 717 is a channel including other control information 711 and first consecutive resource block set (hereinafter referred to as 'reference resource block') information 712. In this case, the presence/absence of the additional consecutive resource block set(s) is indicated through an additional resource allocation indicator 713. That is, the presence/absence of the additional control channel 718 is determined according to the additional resource allocation indicator 713. Although a size of the additional control channel 718 is variable according to the number of additional consecutive resource block sets, the terminal has no need to perform blind decoding using all control channel formats as in FIG. 7A. The terminal performs blind decoding on the reference control channel in the first determined format. Upon success in the decoding of the reference control channel 717, the terminal only needs to additionally perform blind decoding on the additional control channel 718 within the limit indicated by the reference control channel 717. This provides a decrease in the complexity and load required for reception decoding.

The additional resource allocation indicator 713 included in the reference control channel 717 can be generated in two possible embodiments.

In a first embodiment, the additional resource allocation indicator is composed of one bit to indicate only the presence/absence of the additional control channel. That is, it indicates only the presence/absence of multiple consecutive resource block sets allocated by a scheduler.

In a second embodiment, the additional resource allocation indicator is composed of multiple bits to indicate not only the presence/absence of the additional control channel, but also the number of consecutive resource block sets included in the additional control channel. For example, when 2 bits are used as in Table 1, there are four possible types of the information indicated by the additional resource allocation indicator.

TABLE 1

| Additional resource allocation indicator | Definition |
| --- | --- |
| 00 | Absence of additional control channel. |
| 01 | Presence of additional control channel<br>One additional consecutive resource block set |

TABLE 1-continued

| Additional resource allocation indicator | Definition |
| --- | --- |
| 10 | Presence of additional control channel<br>Two additional consecutive resource block sets |
| 11 | Presence of additional control channel<br>Three or more additional consecutive resource block sets |

That is, the second embodiment defines the formats of the additional control channel according to the additional resource allocation indicator to thereby reduce the number of blind decoding processes that the terminal needs for reception of the additional control channel. This contributes to a decrease in the complexity and load of the terminal's reception operation.

The size of the additional resource allocation information included in the additional control channel of FIG. 7B may be determined according to the resource allocation information included in the reference control channel.

Figure 5:
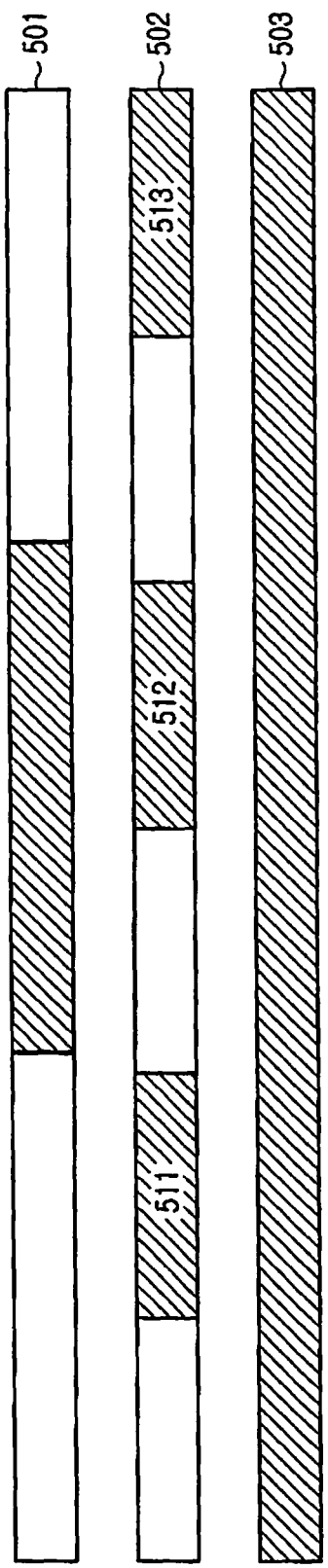
FIG. 5 is a diagram illustrating frequency resources allocated in a general OFDM system.

Referring back to FIG. 5, the reference control channel includes therein a resource block set indicated by reference numeral 511, and the additional control channel includes therein resource block sets indicated by reference numeral 512 and reference numeral 513. In this case, the number of bits required for expressing a start point in indicating the first consecutive resource block set 511 is the number of bits with which it is possible to express the number of resource blocks available in the frequency band. That is, the number of bits required for indicating a start point of the reference resource block can be defined as shown in Equation (1).

$$\text{reference resource block\_start point\_bit} = \lceil \log 2(\text{NUM\_of\_RBs}) \rceil \quad (1)$$

In Equation (1), $\lceil a \rceil$ denotes the minimum integer not less than 'a'.

In the 10-MHz system where 100 RBs are used, the number of bits required for indicating a start point of a resource block is 7. However, since the part where additional allocation resource blocks are allocated is limited to the parts after the block where the reference resource block is allocated, the number of bits required for indicating the start point can be reduced. That is, if the parts where additional allocation resource blocks can be allocated after reference resource block is allocated are reduced to 50 RBs, 6 bits are enough to indicate the start points for the additional allocation resource blocks. This can be mathematically expressed as Equation (2).

$$\text{additional resource block\_start point\_bit} = \lceil \log 2(\text{Num\_of\_remaining RBs}) \rceil \quad (2)$$

An embodiment of the present invention includes changing a size of (or the number of) the additional resource allocation information bits according to the reference allocation resources. A decrease in the number of additional allocation resource bits can contribute to a reduction in the transmission power and an increase in the coverage in transmitting the additional control channel. The method of changing the bit size can be applied together not only to the start points for resource allocation, but also to the resource block length.

Figure 8:
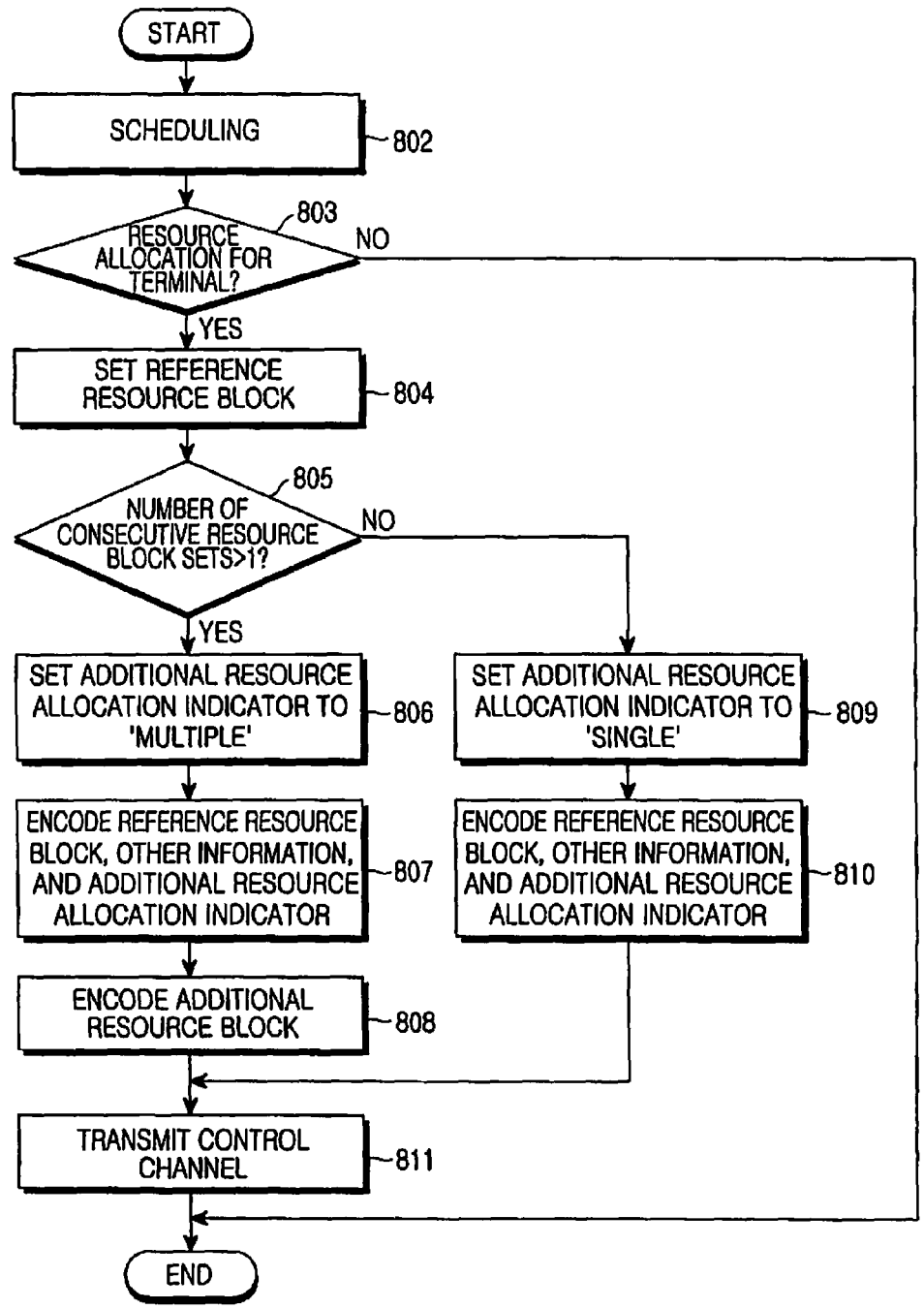
FIG. 8 is a signal flow diagram illustrating a control channel transmission method for resource allocation in a base station according to an embodiment of the present invention.
Figure 9:
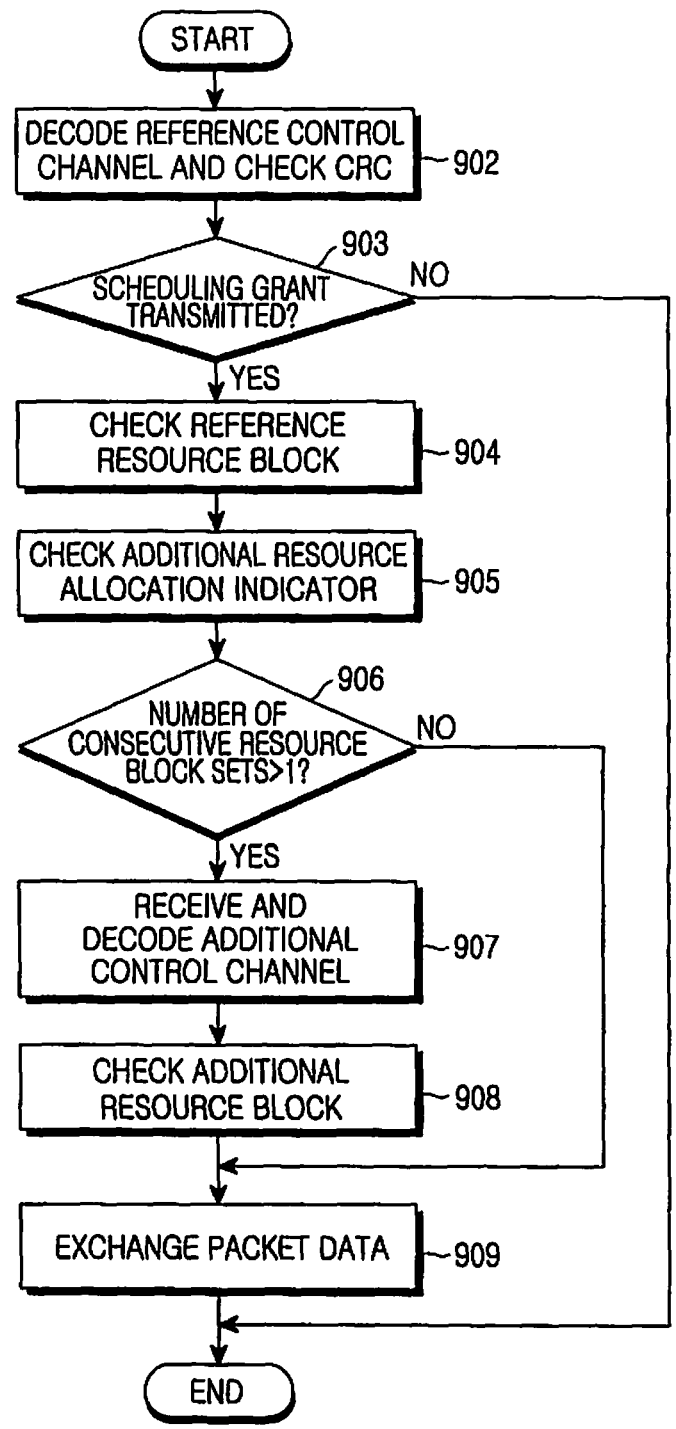
FIG. 9 is a control flow diagram for transmitting/receiving packet data depending on received resource allocation information in a terminal according to an embodiment of the present invention.

With reference to FIGS. 8 and 9, a detailed description is provided of a control channel transmission/reception method of a base station and a terminal based on the foregoing control channel structure according to an embodiment of the present invention.

FIG. 8 is a signal flow diagram illustrating a control channel transmission method for resource allocation in a base station according to an embodiment of the present invention.

Referring to FIG. 8, as the transmission operation begins, a base station performs scheduling in step 802. Thereafter, in step 803, the base station determines whether resource allocation for an arbitrary terminal has been performed. If it is determined in step 803 that the resource allocation is not performed, the base station terminates the methodology of FIG. 8. However, if it is determined in step 803 that resources are allocated to a particular terminal, the base station proceeds to step 804 where it checks consecutive resource block sets, and sets the first consecutive resource block set as a reference resource block. Thereafter, in step 805, the base station determines whether there is any additional consecutive resource block set(s). If it is determined in step 805 that the number of consecutive resource block sets is greater than one (indicating the multiple number of consecutive resource block sets), i.e., if there is an additional consecutive resource block set(s), the base station proceeds to step 806, and if there is no additional consecutive resource block set, the base station proceeds to step 809.

In step 809, the base station sets an additional resource allocation indicator to indicate that the number of consecutive resource block sets is one, then proceeds to step 810 where it encodes a reference control channel including the reference resource block information, the other control information, and the additional resource allocation indicator indicating the single number of the consecutive resource block sets. Thereafter, in step 811, the base station transmits the generated reference control channel, and then ends the transmission operation.

However, in step 806, the base station sets the additional resource allocation indicator. In this case, the additional resource allocation indicator, as described above, can be composed of 1 bit to indicate only the presence/absence of additional resource blocks, or can be composed of two or more bits to indicate not only the presence/absence of added resource blocks, but also the number of added resource block sets. Thereafter, in step 807, the base station encodes a reference control channel including reference resource block information, other control information, and additional resource allocation indicator indicating the multiple number of the consecutive resource block sets.

Thereafter, in step 808, the base station encodes the additional resource allocation information to generate an additional control channel. A size of the additional resource allocation information can be calculated using Equation (2) as described above. Thereafter, in step 811, the base station transmits the generated reference control channel and additional control channel, and then ends the transmission operation.

FIG. 9 is a control flow diagram for transmitting/receiving packet data depending on received resource allocation information in a terminal according to an embodiment of the present invention.

As the reception operation begins, a terminal performs decoding on a reference control channel and checks its Cyclic Redundancy Code (CRC) in step 902. That is, in step 902, the terminal checks only the presence/absence of the reference control channel received using only the format of the reference control channel. In this case, the terminal determines the presence/absence of an error in received information through the CRC check. Thereafter, in step 903, the terminal determines whether a scheduling grant is transmitted thereto. If it is determined in step 903 that no reference control channel is transmitted to the terminal itself, the terminal ends the methodology of FIG. 9.

However, if it is determined in step 903 that a reference control channel has been transmitted to the terminal itself, the terminal proceeds to step 904 where it checks reference resource blocks included in the reference control channel. Thereafter, in step 905, the terminal checks an additional resource allocation indicator. In step 906, the terminal determines whether a value of the additional resource allocation indicator indicates that the number of consecutive resource block sets is greater than one (indicating the multiple number of consecutive resource block sets), and proceeds to step 907 if the number of consecutive resource block sets is greater than one, and otherwise, proceeds to step 909.

If it is determined in step 906 that information in the additional resource allocation indicator indicates a single number of consecutive resource block sets, the terminal proceeds to step 909 where it receives/decodes the packet data using only the reference resource block, and then ends the reception operation. However, if it is determined in step 906 that the information in the additional resource allocation indicator indicates the multiple number of consecutive resource block sets, the terminal proceeds to step 907 where it detects an additional control channel and receives/decodes the detected additional control channel. Thereafter, in step 908, the terminal checks additional resource block information included in the additional control channel, and then proceeds to step 909 where it receives/decodes the packet data using the reference resource block and additional resource block information, and then ends the reception operation.

Figure 10:
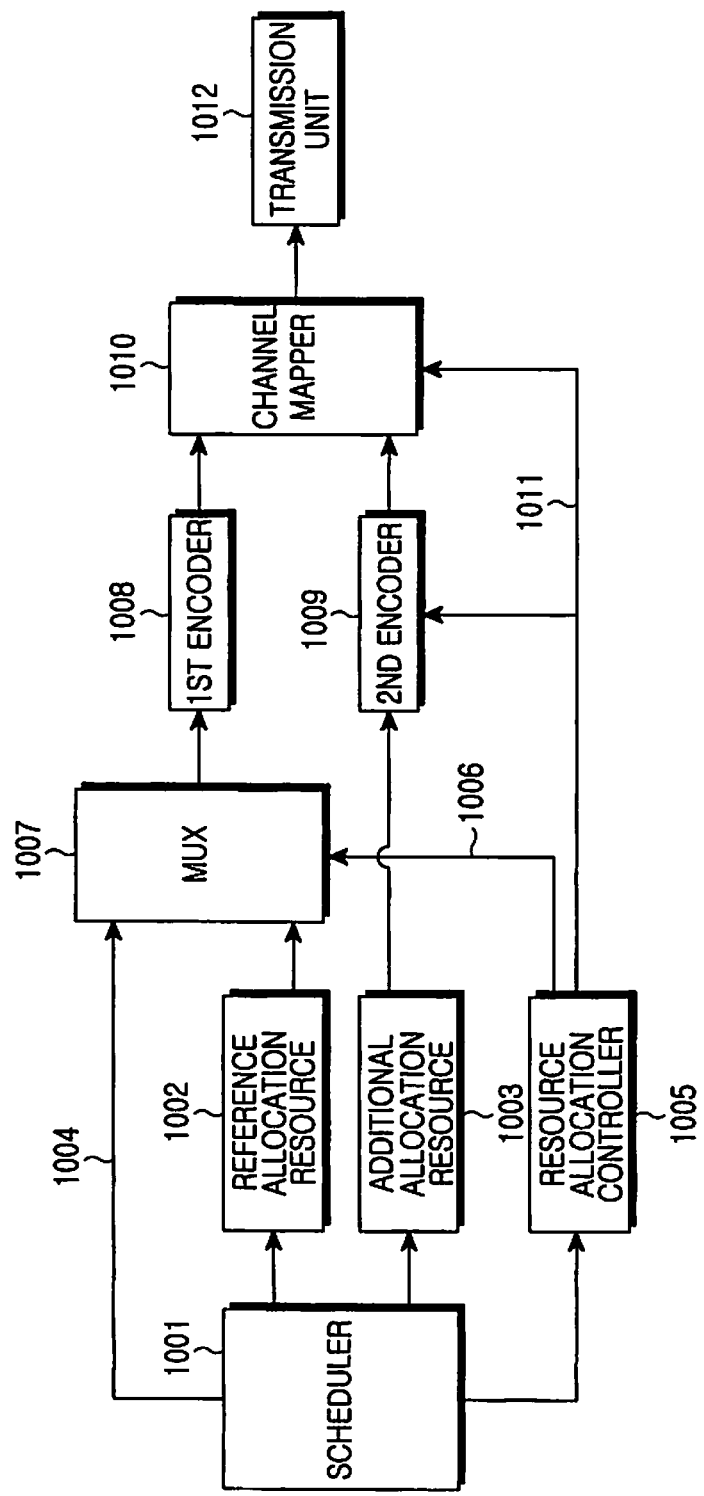
FIG. 10 is an internal block diagram illustrating a structure of a base station's transmitter according to an embodiment of the present invention.
Figure 11:
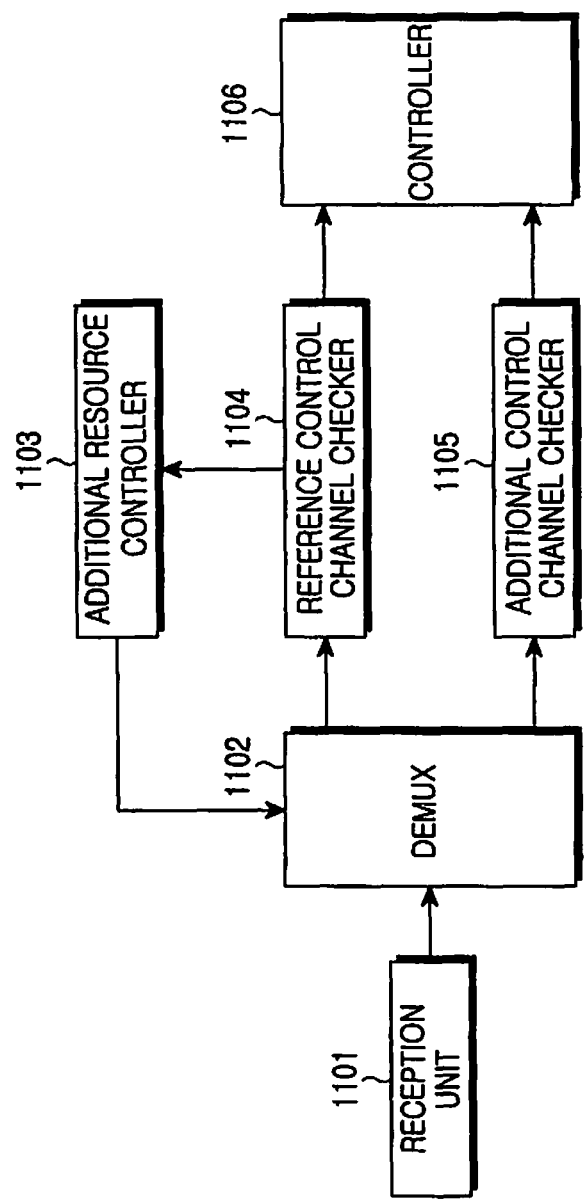
FIG. 11 is an internal block diagram illustrating a terminal's receiver according to an embodiment of the present invention.

With reference to FIGS. 10 and 11, a description is provided of a transceiver structure according to an embodiment of the present invention.

FIG. 10 is an internal block diagram illustrating a key structure of a base station's transmitter according to an embodiment of the present invention.

A scheduler 1001 allocates resources for an arbitrary terminal, and divides the resources into reference allocation resources 1002 and additional allocation resources 1003 according to the consecutive resource set. The reference allocation resources 1002 are applied to a multiplexer 1007 together with other control information 1004 and additional resource allocation indicator 1006 generated by the scheduler 1001. The multiplexer 1007 multiplexes the input information, and provides its output to a first encoder 1008. Then the first encoder 1008 encodes the received information according to a predetermined scheme to generate a reference control channel. The encoded symbols are input to a channel mapper 1010 where it is mapped to a physical channel and then transmitted to the terminal.

Further, the scheduler 1001 outputs the information set in the additional resource allocation indicator 1006 to a resource allocation controller 1005. Then the resource allocation controller 1005 generates the additional resource allocation indicator 1006 indicating the single/multiple number of consecutive resource block sets, and provides its output to the multiplexer 1007. That is, the resource allocation controller 1005 determines the presence/absence of additional consecutive resource block set(s) according to the scheduling result of the scheduler 1001. If it is determined by the resource allocation controller 1005 that the number of consecutive resource block sets is greater than one, the additional allocation resources 1003 are input to a second encoder 1009. Then the second encoder 1009 encodes the additional allocation resources 1003 using a predetermined scheme to generate an additional control channel, and provides its output to the channel mapper 1010. Then the channel mapper 1010 maps the additional control channel to a physical channel along with the reference control channel, and then transmits it to the terminal by means of a transmission unit 1012.

The additional control channel is mapped by the channel mapper 1010 according to a control signal 1011 controlled by the resource allocation controller 1005. In generating the control signal 1011, if the reference control channel is mapped to one CCE shown in FIG. 6, the additional control channel is mapped to a CCE succeeding the CCE to which the reference control channel is mapped. To keep its flexibility, the additional control channel can also be mapped to any CCE regardless of the CCE to which the reference control channel is mapped. The number of CCEs to which the reference control channel is mapped can vary according to the channel condition, and the number of CCEs, to which the additional control channel is mapped, is also determined according thereto. In addition, since the size of the additional control channel varies according to the number of consecutive resource block sets included in the additional allocation resources 1003, the number of CCEs to which the additional control channel is mapped can also vary together.

FIG. 11 is an internal block diagram illustrating a terminal's receiver according to an embodiment of the present invention.

A terminal demultiplexes a signal received through a reception unit 1101 by means of a demultiplexer 1102. The demultiplexed signal is basically input to a reference control channel checker 1104. That is, the demultiplexer 1102 preferentially detects a reference control channel signal, and outputs it to the reference control channel checker 1104. The reference control channel checker 1104 determines whether a reference control channel has been received at the terminal. When the reference control channel is received, the reference control channel checker 1104 outputs an additional resource allocation indicator included in the reference control channel to an additional resource controller 1103. Then the additional resource controller 1103 controls a demultiplexer 1102 according to a value of the additional resource allocation indicator included in the reference control channel. That is, if the additional resource allocation indicator indicates the inclusion of additional resources, the additional resource controller 1103 controls the demultiplexer 1102 to demultiplex the channel signal except for the reference control channel, and to provide its output to an additional control channel checker 1105. If the additional resource allocation indicator indicates the single number of consecutive resource block sets, the additional resource controller 1103 controls the demultiplexer 1102 to receive no additional control channel. However, if the additional resource allocation indicator indicates multiple consecutive resource block sets, the additional resource controller 1103 controls the demultiplexer 1102 to receive the additional control channel, and the additional control channel checker 1105 checks the additional allocation resources. Thereafter, the information from the reference control channel checker 1104 and the information from the additional control channel checker 1105 are input to a controller 1106 where they are used for receiving a physical channel.

In FIG. 11, the structure necessary for data transmission/reception can follow the general structure, or any modified structure available, the details of which would be obvious to those skilled in the art.

As is apparent from the foregoing description, the application of the present invention can efficiently signal allocation resources in the OFDMA communication system, thereby simplifying the reception operation of the terminal, enabling flexible resource allocation, and facilitating efficient utilization of resources.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting a control channel for resource allocation to a plurality of terminals by a base station in an Orthogonal Frequency Division Multiple Access (OFDMA) wireless communication system, the method comprising the steps of, for each of the plurality of terminals:
    setting a first consecutive resource block set as a reference resource block for the terminal;
    setting an additional resource allocation indicator indicating whether a number of consecutive resource block sets allocated to the terminal is greater than one;
    generating a reference control channel including reference resource allocation information for the first consecutive resource block set and the set additional resource allocation indicator;
    generating, when there are one or more additional consecutive resource block sets, an additional control channel for the terminal including additional resource allocation information for one or more additional consecutive resource block sets; and
    encoding at least one of the generated reference control channel and the additional control channel before transmission.

2. The method of claim 1, wherein the additional resource allocation indicator comprises one bit to indicate presence or absence of the additional control channel.

3. The method of claim 1, wherein the additional resource allocation indicator comprises a plurality of bits to indicate presence or absence of the additional control channel, and a number of consecutive resource block sets included in the additional control channel.

4. The method of claim 1, wherein a number of bits required for indicating a start point of an additional resource block included in the additional resource allocation information is calculated using a number of resource blocks following a block to which a reference resource block is allocated.

5. A method for a terminal to receive a control channel for resource allocation transmitted from a base station in an Orthogonal Frequency Division Multiple Access (OFDMA) wireless communication system, the method comprising the steps of:
    checking a first consecutive resource block set for the terminal using reference resource allocation information included in a reference control channel received from a base station;
    determining whether a value of an additional resource allocation indicator indicates that a number of consecutive resource block sets for the terminal is greater than one; and
    receiving, when the number of consecutive resource block sets is greater than one, an additional control channel and checking one or more additional resource blocks using additional resource allocation information included in the additional control channel.

6. The method of claim 5, wherein the additional resource allocation indicator comprises one bit to indicate presence or absence of the additional control channel.

7. The method of claim 5, wherein the additional resource allocation indicator comprises multiple bits to indicate presence or absence of the additional control channel, and a number of consecutive resource block sets included in the additional control channel.

8. The method of claim 5, wherein a number of bits required for indicating a start point of an additional resource block included in additional resource allocation information is calculated using a number of resource blocks following a block to which a reference resource block is allocated.

9. A base station apparatus for transmitting a control channel for resource allocation to a terminal in an Orthogonal Frequency Division Multiple Access (OFDMA) wireless communication system, the apparatus comprising:
- a scheduler configured for allocating resources for the terminal, and outputting a scheduling result and other control information together with the resource allocation information;
- a resource allocation controller configured for determining, based on the scheduling result, whether a number of consecutive resource block sets for the terminal is greater than one and generating an additional resource allocation indicator corresponding to the determination result;
- a multiplexer configured for multiplexing reference allocation resources, the other control information, and the additional resource allocation indicator for the terminal;
- a first encoder configured for encoding information output from the multiplexer to generate a reference control channel including reference resource allocation information and the additional resource allocation indicator; and
- a second encoder configured for encoding additional allocation resources according to the determination result output from the resource allocation controller, to generate an additional control channel including additional resource allocation information.

10. The apparatus of claim 9, wherein the additional resource allocation indicator comprises one bit to indicate presence or absence of the additional control channel.

11. The apparatus of claim 9, wherein the additional resource allocation indicator comprises multiple bits to indicate presence or absence of the additional control channel, and a number of consecutive resource block sets included in the additional control channel.

12. The apparatus of claim 9, wherein a number of bits required for indicating a start point of an additional resource block included in additional resource allocation information is calculated using a number of resource blocks following a block to which a reference resource block is allocated.

13. A terminal apparatus for receiving a control channel for resource allocation transmitted from a base station in an Orthogonal Frequency Division Multiple Access (OFDMA) wireless communication system, the apparatus comprising:
- a reference control channel checker configured for receiving a reference control channel for the terminal apparatus including reference resource allocation information and an additional resource allocation indicator and outputting the additional resource allocation indicator;
- an additional resource controller configured for determining, based on the additional resource allocation indicator, whether a number of consecutive resource block sets for the terminal apparatus is greater than one and outputting a control signal according to the determination result; and
- a demultiplexer configured for separating out an additional control channel according to the control signal from the additional resource controller and outputting the separated additional control channel.

14. The apparatus of claim 13, wherein the additional resource allocation indicator comprises one bit to indicate presence or absence of the additional control channel.

15. The apparatus of claim 13, wherein the additional resource allocation indicator comprises a plurality of bits to indicate presence or absence of the additional control channel, and a number of consecutive resource block sets included in the additional control channel.

16. The apparatus of claim 13, wherein a number of bits required for indicating a start point of an additional resource block included in additional resource allocation information is calculated using a number of resource blocks following a block to which a reference resource block is allocated.

* * * * *